Feb. 6, 1951 — H. S. CAMPBELL — 2,540,473
PITCH CONTROL MECHANISM FOR PIVOTED
BLADE AIRCRAFT SUSTAINING ROTORS
Original Filed Aug. 7, 1942 — 2 Sheets-Sheet 1

INVENTOR
Harris S. Campbell
BY
Synnestvedt & Lechner
ATTORNEYS

Feb. 6, 1951  H. S. CAMPBELL  2,540,473
PITCH CONTROL MECHANISM FOR PIVOTED
BLADE AIRCRAFT SUSTAINING ROTORS
Original Filed Aug. 7, 1942  2 Sheets-Sheet 2

INVENTOR
Harris S. Campbell
BY
Synnestvedt & Lechner
ATTORNEYS

Patented Feb. 6, 1951

2,540,473

UNITED STATES PATENT OFFICE 2,540,473

PITCH CONTROL MECHANISM FOR PIVOTED BLADE AIRCRAFT SUSTAINING ROTORS

Harris S. Campbell, Bryn Athyn, Pa., assignor to Autogiro Company of America, Philadelphia, Pa., a corporation of Delaware Original application August 7, 1942, Serial No. 453,932. Divided and this application February 11, 1947, Serial No. 727,758

5 Claims. (Cl. 170—160.25)

This invention relates to rotative winged aircraft, and especially to aircraft of this type in which the rotor blade or blades are mounted for pitch change movement.

The present application is a division of my copending application Serial No. 453,932, filed August 7, 1942, now Patent 2,428,200 dated September 30, 1947.

Blade pitch change in sustaining rotors has been employed for control purposes, for example, in the manner described and claimed in copending application of Juan de la Cierva, Serial No. 698,372, filed November 16, 1933, and issued July 31, 1945, as Patent No. 2,380,582. When employing pitch change for control purposes, for instance for longitudinal and lateral attitude control, the pitch of each blade is caused to vary periodically with rotation of the rotor.

With various prior pitch control systems for the above purpose, aerodynamic and dynamic loads developed in the blades have been transmitted to the control system. For instance, during rotation of the rotor, especially when the control is adjusted appreciably from the neutral setting, inertia loads are set up as a result of the rapid periodic oscillations of the blades in the pitch change sense. Forces from this origin have heretofore been transmitted to the control system. Another source of undesired tendency to affect the control system is the rapid change which the blades experience in aerodynamic pitching moment during translational flight, even with the control system adjusted to the neutral position.

Loads from various origins such as the foregoing may cause deflections in the control linkage and even actual movement of the complete control system, with the result that undesired blade pitch changes occur. Under some forces and conditions, these undesired pitch change movements tend to build up resonantly, thereby becoming excessive, and causing objectionable vibrations even of the whole aircraft.

According to the present invention a pitch control system is provided, which system completely or at least partially restrains the blades as against undesired movements while at the same time permitting free operation of the control system by the pilot.

With the above in mind, the invention contemplates employment of a wholly or partially irreversible device in the control linkage, which device is located, preferably both functionally and structurally, close to the blade. In the preferred construction, the irreversible device comprises complementary worm and worm wheel elements, the latter of which is mounted directly on the blade, so that the undesired forces are arrested at their origin and prevented from entering the control system.

In considering another aspect of the invention it should be kept in mind that sustaining rotors ordinarily incorporate one or more pivots for the blades by means of which the blades are connected with the hub. Usually each rotor blade is connected with the hub at least by a "flapping" pivot, and the connection may also include a "drag" pivot, the two pivots providing, respectively, for swinging movement of the blade in a direction generally transverse of the mean rotative path of travel and in a direction within the said path of travel.

In such a pivoted rotor, pitch control connections must necessarily accommodate the swinging movements of the blades and the means provided for such accommodation necessarily introduces additional links, joints, levers, or the like, in all of which additional opportunity is afforded for aerodynamic and dynamic loads to set up undesired vibrations and the like.

With the foregoing in mind, the invention further contemplates special arrangement of the irreversible pitch control device with relation to the blade pivots, and also special arrangement of the actuating connections, whereby not only to accommodate flapping or lag-lead movements of the blades but also to arrest undesired blade movements in the pitch change sense at a point in the control system beyond the mechanism for accommodating the swinging movements of the blades.

Still another factor which should be kept in mind is that swinging movements of the blades, especially in the flapping sense, should not extensively alter the blade pitch, and in some cases even minor changes of blade pitch as a result of flapping movements are undesirable. With this in mind the invention provides a pitch control system in which no pitch change will accompany flapping movement of the blades.

The manner in which the foregoing objects and advantages are accomplished and also others which will occur to those skilled in the art will appear more fully from the following description, referring to the accompanying drawings.

Figure 1:
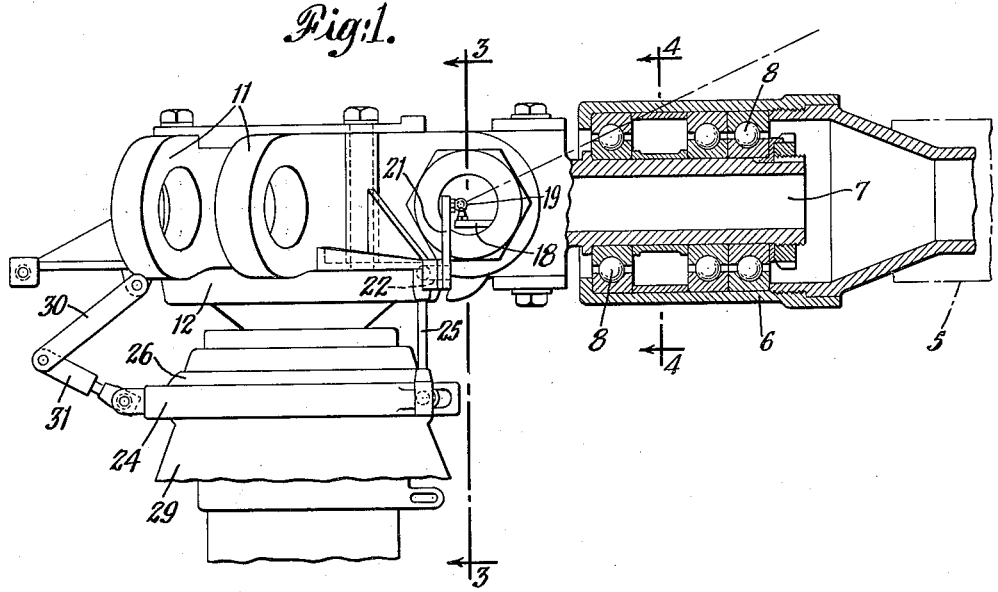
Figure 1 is a side elevational view of a hub arrangement constructed according to the invention, with a portion of the root end mounting for one of the blades shown in vertical section.
Figure 3:
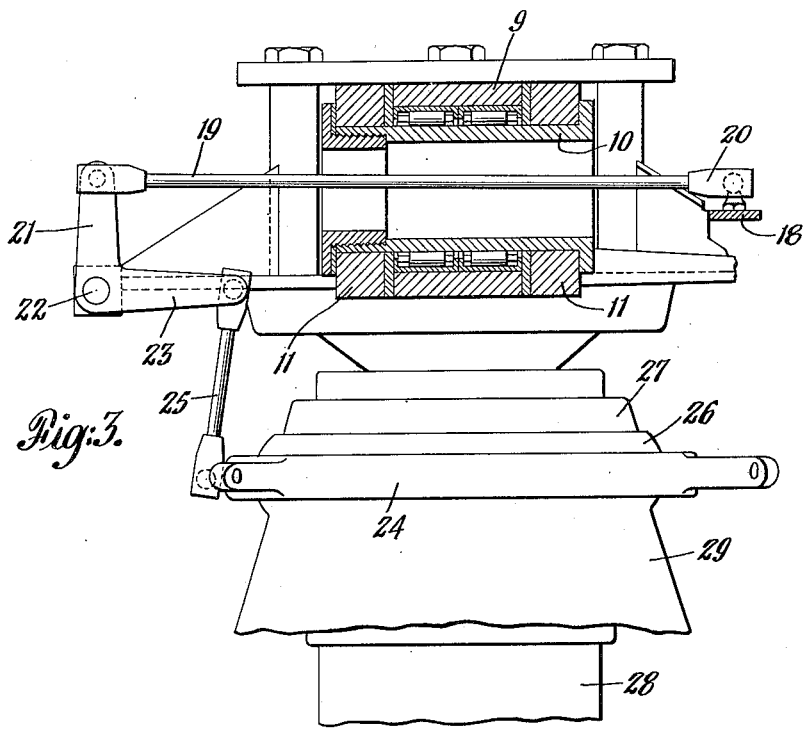
Figure 4:
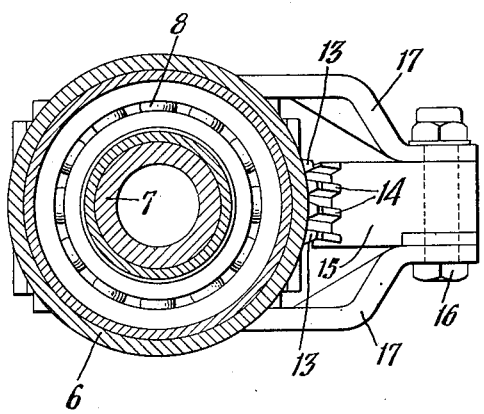

Figures 3 and 4 are sectional views taken respectively as indicated by the lines 3—3 and 4—4 on Figure 1.

Before considering the structure shown in the drawings, it is here mentioned that the invention is applicable to a helicopter in which the rotor is power driven in normal operation, and also to a rotative winged aircraft where the rotor is adapted for auto-rotational actuation in normal operation, in which latter event the rotor may be driven for starting purposes on the ground prior to take-off. As is known and as is disclosed in the copending application above referred to, a rotor drive mechanism for purposes such as those just referred to preferably incorporates a manually operable clutch and also a free wheeling clutch, although these and other parts of the rotor drive transmission are not illustrated herein, since they form no part of the present invention per se.

Figure 2:
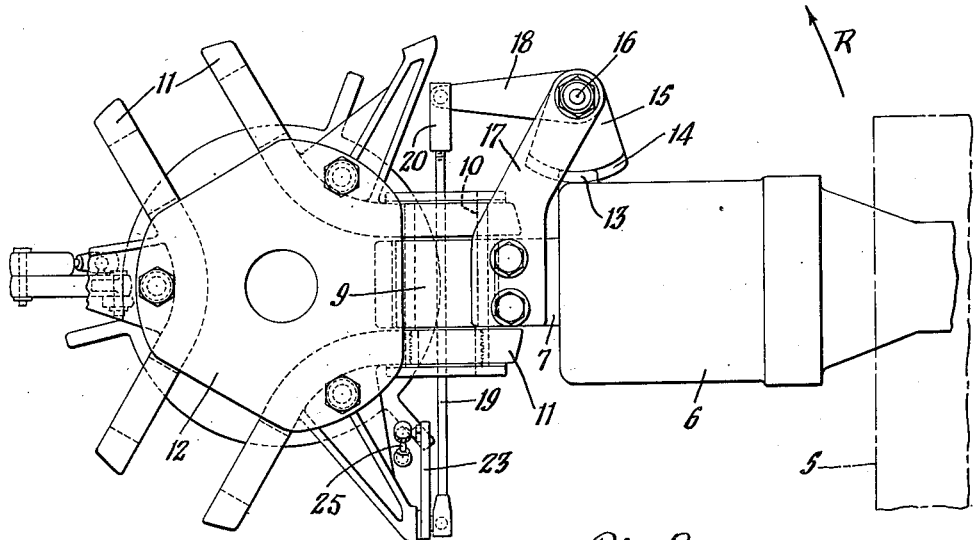
Figure 2 is a top plan view of the arrangement shown in Figure 1.

Any suitable number of blades may be incorporated in the rotor. In the embodiment illustrated the rotor is three bladed, the direction of rotation of the rotor being indicated by the arrow R in Figure 2. Each blade (the root end of one such blade being indicated at 5) is provided with an external sleeve or bearing part 6 mounted on a spindle 7 by means of bearings 8—8, this mounting providing an axis for blade movement substantially coincident with the longitudinal axis of the blade, and therefore constituting a pitch change mounting for the blade. Spindle 7 projects from a link part, the inner end of which constitutes a horizontally apertured lug 9 adapted to cooperate with a flapping pivot 10, the ends of which are received in pairs of lugs 11—11 which project from the hub member 12. Pivot 10 thus provides freedom for swinging movement of the blade in a direction generally transverse the mean rotative path of travel, this swinging movement being desirable for the purpose of compensating for differential lift effects during translational flights as between the advancing and retreating sides of the rotor.

Adjacent its inner end the sleeve 6 of the pitch change mounting is provided with a worm wheel segment 13 with which the teeth 14 of a segmental worm 15 are adapted to mesh. The worm is mounted at 16 on link 7—9 by a pair of brackets 17. The worm actuating arm 18 extends radially inwardly to a point in alignment with the axis of the flapping pivot 10. A push-pull rod 19 extending through the hollowed flapping pivot 10 substantially axially thereof carries a fitting 20 at one end thereof which is coupled with arm 18 by means of a ball joint, the other end of rod 19 being similarly coupled with one arm 21 of the bell crank pivoted at 22, the other arm 23 of the bell crank being linked with the rotative swash ring 24 as by a connection 25, suitably universally joined at its ends to accommodate various of the control motions.

From the above it will be seen that axial movement of rod 19 along the axis line of the flapping pivot will actuate the worm and effect pitch change movement of the blade. As the blade moves on its flapping pivot, however, the control linkage is entirely unaffected, so that the pitch of the blade is not altered with upward and downward swinging movements of the blade. To accommodate the flapping movement a rotative connection is provided between rod 19 and fitting 20. This connection may take the form of a screw threaded joint between these two parts.

The mechanism for tilting and/or for raising and lowering the rotative swash ring 24 is fully disclosed in my copending application above referred to of which the present application is a division, and since this mechanism forms no part of the present invention per se the details thereof need not be illustrated herein. It may be mentioned, however, that the swash ring 24 is carried by a bearing on a nonrotative ring 26 which is tiltable with reference to the internal member 27, the latter also being vertically movable on the cylindrical part 28 which may serve as an external hub supporting shell enclosing bearings by means of which the hub spindle itself is journalled. Control linkages are adapted to be connected with the nonrotative swash ring 26, for instance through the depending skirt or apron 29. A scissors link such as shown at 30—31 in Figure 1 serves to ensure rotation of the swash ring with the rotor hub itself and thus with the blades. Link 30 of this linkage is coupled with the hub and link 31 with ring 24, the two links being interconnected as clearly appears in Figure 1. The joints between the two links (30 and 31) and between link 30 and the hub are desirably simple pivot joints whereby the rotative motion of the hub is utilized to ensure rotation of ring 24 therewith. The joint between link 31 and the ring 24 is desirably of the universal type whereby to accommodate various angular tilting movements of the ring.

From the foregoing description it will be seen that the control connections incorporate an irreversible device at the blade root itself whereby to arrest any undesired forces originating in the blade and prevent transmission thereof to the control system.

With further reference to the operation of the mechanism described, as hereinbefore mentioned, various forces and vibrations originating in the blades have a tendency to deflect or move parts of the control system. Even if these forces are not of magnitude sufficient to actually cause the entire control system to move, they are objectionable in the control system since they tend to deflect linkages or the like and cause vibrations at points of lost motion. The control system of the present invention incorporates a partially or wholly irreversible device (i. e., the worm and worm wheel elements 14 and 13), which is located at the blade itself and thus at the very origin of the forces which have heretofore introduced troublesome effects in the control system.

It is especially to be noted that the foregoing has been accomplished notwithstanding the fact that the blades are pivotally connected with the hub, as by means of flapping pivots such as shown at 10. Moreover, the objects and advantages of the invention above discussed have been accomplished notwithstanding the location of the pitch change mounting outboard of the flapping pivot, this relationship being important for a number of reasons including the fact that pitch change movement of the blade does not alter the angularity of the flapping pivot axis.

It is to be understood that the worm device (or any functionally similar mechanism) may be either totally or only partially irreversible. For most purposes I prefer at least a high degree of or total irreversibility, though it is contemplated that in some instances it may be desirable to reduce the degree of irreversibility so as to permit the transmission of a fraction of the loads to the control system, thereby enabling the pilot to sense or "feel" the conditions under which the rotor is operating.

I claim:

1. In an aircraft having a sustaining rotor incorporating a hub and a blade connected therewith by means of a flapping pivot, a pitch change mounting for the blade operatively interposed between the flapping pivot and the blade, and pitch control mechanism comprising worm and worm wheel elements both mounted for movement with the blade in a flapping sense and the latter element also being mounted on the blade to move therewith in the pitch change sense, and controllable means for actuating the worm element including a control connection extended therefrom to the body of the aircraft and comprising a control member mounted for movement in a direction generally paralleling the axis of the flapping pivot.

2. A construction in accordance with claim 1 in which the control member referred to in claim 1 is positioned in axial alignment with the flapping pivot axis.

3. In an aircraft having a sustaining rotor incorporating a hub and a blade connected therewith by means of a flapping pivot, a pitch change mounting for the blade operatively interposed between the flapping pivot and the blade, and pitch control mechanism including worm and worm wheel elements the latter of which is connected to the blade to move therewith in the pitch change and flapping senses, the worm being mounted to move with the blade in the flapping sense and being located with its axis perpendicular to the axis of the flapping pivot, a lever arm for actuating the worm, said arm projecting from the worm to a point substantially in alignment with the axis of the flapping pivot, and a control connection for operating said lever arm movable substantially axially of said flapping pivot.

4. A construction in accordance with claim 3 in which the flapping pivot is hollow and in which said control connection comprises a push pull member extended through the flapping pivot.

5. A construction in accordance with claim 3 in which the flapping pivot is hollow and in which said control connection comprises a push pull member extended through the flapping pivot, together with a swash member and additional control means cooperating with said push pull member and extended downwardly therefrom for cooperation with said swash member.

HARRIS S. CAMPBELL.

REFERENCES CITED

The following references are of record in the file of this patent:

UNITED STATES PATENTS

| Number | Name | Date |
|---|---|---|
| 2,030,578 | Flettner | Feb. 11, 1936 |
| 2,162,794 | Asboth | June 20, 1939 |
| 2,203,012 | Campbell | June 4, 1940 |
| 2,216,162 | Cierva | Oct. 1, 1940 |
| 2,380,582 | Cierva | July 31, 1945 |
| 2,421,364 | Cierva | May 27, 1947 |
| 2,428,200 | Campbell | Sept. 30, 1947 |